(12) United States Patent
Agush

(10) Patent No.: US 11,258,922 B2
(45) Date of Patent: *Feb. 22, 2022

(54) METHOD OF COMBINING IMAGE FILES AND OTHER FILES

(71) Applicant: Shuttersong Incorporated, Wellesley, MA (US)

(72) Inventor: William Agush, Wellesley, MA (US)

(*) Notice: Subject to any disclaimer, the term of this patent is extended or adjusted under 35 U.S.C. 154(b) by 991 days.

This patent is subject to a terminal disclaimer.

(21) Appl. No.: 14/643,109

(22) Filed: Mar. 10, 2015

(65) Prior Publication Data

US 2015/0189120 A1 Jul. 2, 2015

Related U.S. Application Data

(63) Continuation of application No. 13/585,505, filed on Aug. 14, 2012, now Pat. No. 9,009,123.

(51) Int. Cl.
| | |
|---|---|
| *G06F 15/16* | (2006.01) |
| *H04N 1/32* | (2006.01) |
| *H04N 21/81* | (2011.01) |
| *H04N 21/854* | (2011.01) |

(52) U.S. Cl.
CPC ..... *H04N 1/32128* (2013.01); *H04N 21/8106* (2013.01); *H04N 21/8153* (2013.01); *H04N 21/85406* (2013.01)

(58) Field of Classification Search
CPC ........... H04N 1/32128; H04N 21/8106; H04N 21/8153; H04N 21/85406
See application file for complete search history.

(56) References Cited

U.S. PATENT DOCUMENTS

| | | | |
|---|---|---|---|
| 6,888,569 B2 | 5/2005 | Fox et al. | |
| 6,915,012 B2 | 7/2005 | Osborne et al. | |
| 6,990,293 B2 | 1/2006 | Hu | |
| 7,359,085 B2* | 4/2008 | Edwards | H04N 1/32101 358/1.1 |
| 7,782,373 B2 | 8/2010 | Seo et al. | |
| 8,271,544 B2* | 9/2012 | Chan | G06F 17/30265 707/803 |
| 2001/0056575 A1* | 12/2001 | Wei | G11B 27/10 725/41 |
| 2003/0174218 A1 | 9/2003 | Battles et al. | |
| 2004/0141630 A1 | 7/2004 | Bhaskaran et al. | |
| 2004/0150723 A1 | 8/2004 | Seo et al. | |
| 2006/0239564 A1 | 10/2006 | Cha et al. | |
| 2007/0250532 A1* | 10/2007 | Beato | G06F 17/30265 |
| 2008/0129758 A1 | 6/2008 | Fox et al. | |
| 2008/0298720 A1* | 12/2008 | Klassen | H04N 1/00307 382/298 |

(Continued)

OTHER PUBLICATIONS

Cheddad et al (NPL, Digital Image Steganography: Survey and analysis of current methods, Sep. 6, 2009, Elsevier) hereinafter "Cheddad".*

*Primary Examiner* — Alex Gofman
(74) *Attorney, Agent, or Firm* — Lambert Shortell & Connaughton; David J. Connaughton, Jr.; Justin P. Tinger

(57) ABSTRACT

A method and system for combining, communicating, storing and/or separating image data and non-image data. The method involves a computer programmed to identify an end-of-file (EOF) marker of an image file, and being programmed to add the non-image data to the image file after the EOF marker.

12 Claims, 6 Drawing Sheets

(56) References Cited

U.S. PATENT DOCUMENTS

| | | | |
|---|---|---|---|
| 2008/0304769 A1* | 12/2008 | Hollander | G06F 16/51 382/305 |
| 2009/0046940 A1* | 2/2009 | Beato | H04N 21/23892 382/249 |
| 2009/0103778 A1* | 4/2009 | Yoshizumi | G06K 9/00221 382/103 |
| 2013/0026221 A1* | 1/2013 | Murray | G11B 27/24 235/375 |

* cited by examiner

Figure 4

Hexadecimal representation of the data file container. The container comprises an audio file and a text file.

The data file container shown here is with normal compression and without encryption.

METHOD OF COMBINING IMAGE FILES AND OTHER FILES

BACKGROUND OF THE INVENTION

Field of the Invention

The present invention relates generally to computer data storage. More particularly the present invention relates to the combination of an image file and another non-image file into a single combined file.

Description of Related Art

Image files are becoming increasingly popular media to share pictures on computers, over the internet or other networks, and are viewed on a number of different computing devices. As network bandwidth, computer storage, and mobile computing increases, image file sharing has seen exponential growth. With such increases in image file sharing, there is a growing desire to add other elements to image files such as text, audio, and the like.

However, one of the problems associated with storing application data in an image file such as a JPEG file is that the application data cannot contain JPEG or other image marker codes. In some instances, decoders can mistake application data as image data and cause irrecoverable failure of the decoding process and the file may not be useable.

Techniques exist for associating non-JPEG data with JPEG files. For example, users wishing to create digital images with sound can create a separate audio, e.g. a .wav, file along side their image file. However, even with the advanced, error-correcting communication networks that exist today, having a separate file increases the possibility of file corruption, separation, loss, or deletion during transmission and storage.

Therefore, a need exists for a system and method for storing non-image data along with image data in a single, transmittable file that does not alter the image file data structure. A need also exists for a system and method for presenting the single combined file without separation of the files therein. A further need exists for returning the image and non-image data to their original, separated state for use with an application program.

SUMMARY OF THE INVENTION

The subject matter of this application may involve, in some cases, interrelated products, alternative solutions to a particular problem, and/or a plurality of different uses of a single system or article.

In one aspect, a method of combining an image file with a non image file is provided. The method may begin with identifying an image file and non-image file to be combined. Once identified, a computer may read the image file to identify the end-of-file marker of the file. Once identified, the computer may write or otherwise attach the non-image file data immediately after the end-of-file marker, thereby forming a single file comprising image and non-image data.

In another aspect, a method of presenting a combined image and non-image data file is provided. The method may begin by a computer receiving a combined data file having both image data and non-image data, the non-image data being written to the combined data file immediately after an end-of-file marker of the image data. The computer may then read the combined file to identify the position of the end-of-file marker of the image file. The data read before the end-of-file marker being identified as an image file. The computer may then read the combined file immediately after the end-of-file marker until the end of the file. The data read immediately after the end-of-file marker being identified as a non-image file. The computer may then be configured to present the identified image file data and the identified non-image file data to a user.

In yet another aspect, a method of presenting a combined image and non-image data file is provided. The method may begin by a computer receiving a combined data file having both image data and non-image data, the non-image data being written to the combined data file immediately after an end-of-file marker of the image data. The computer may then read the combined file to identify the position of the end-of-file marker of the image file. The data read before the end-of-file marker being identified as an image file. The computer may then read the combined file immediately after the end-of-file marker until the end of the file. The data read immediately after the end-of-file marker being identified as a non-image file. The computer may then be configured to save the identified image file data and the identified non-image file data to a computer's file system.

BRIEF DESCRIPTION OF THE DRAWINGS

FIG. 4 provides a data file container comprising an audio data file and a non-JPEG data file in hexadecimal format.

DETAILED DESCRIPTION

Figure 1:
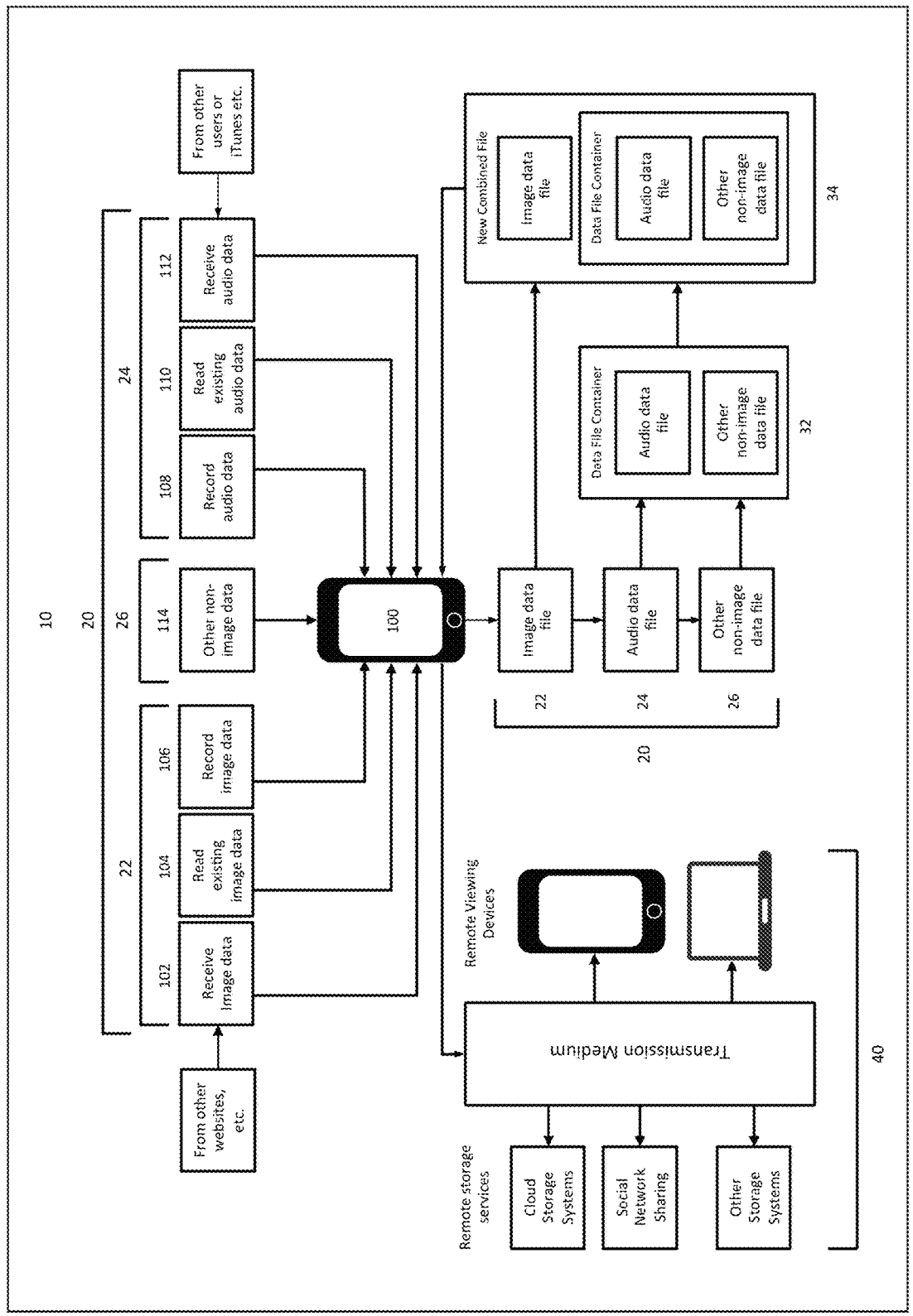
FIG. 1 provides a flowchart of an embodiment of the present invention is shown that combines image and non-image data, and utilization the combined file.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Adding non-image data into an image file offers many practical uses. For example, still images or pictures may be transmitted over the internet with an accompanying audio file, which may represent the sound in the environment where the image was taken, a person's voice, or music created on a computer or purchased on the internet. This may allow individuals to share pictures with the sounds of a sporting event, a child's first words, a musical passage that communicates something about the picture, consumer packaged goods companies (CPG) can transmit pictures of their products with a commercial message and many other uses.

Generally, the present invention concerns a method and system for combining, communicating, storing and/or separating image data and non-image data. The method involves a computer programmed to identify an end-of-file (EOF) marker of an image file, and being programmed to add the non-image data to the image file after the EOF marker. Once combined, the image file and non-image data are saved as a single file. The file may then be sent, stored, accessed, and the like as if it were any other file. Further, additional data may be added to the combined file to combine three or more sets of data. While the disclosure herein refers to a combination of image and non-image files, it should be understood that the methods herein may be applied to the combination of any different file types as long as one of the files has an EOF marker.

The image files contemplated herein may be any digital image format capable of being interpreted by a computer or computing device. Examples of image files contemplated herein include, but are not limited to JPEG, GIF, TIFF, PNG, Bitmap, RAW, PNM, WEBP, and the like.

The non-image data files contemplated herein may be any digital non-image files. Examples of non-image data files may include text files, word processing files, audio files such as MP3, MP4 AIFF, WAV, etc., movie files, and the like.

The non-image data that may be combined with the image files may be any non-image, computer-readable data. Examples of non-image data may include audio data files, text data files, word processing document data files, email message data files, text message data files, social posting data files, chat transcript data files, location data, spreadsheet data files, account information data, document data files, and the like.

The computer or computing devices contemplated herein may include, but are not limited to, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Initially the computer may be programmed to identify two (or more) files: an image data file, and a non-image data file. The computer may then be programmed to identify the files as such, and identify that they may be combined. When instructed to combine the image data file and non-image data file, the computer may be programmed to begin reading the image file, starting at a beginning of the image file, and reading until the computer encounters an EOF marker. EOF markers are hexadecimal tags that indicate an end of file. The EOF marker may vary for different file types, however all image data file formats contain an EOF marker. The computer is programmed to identify the end of file marker of the image data file, and may be further programmed to identify new EOF markers as different image file types are developed.

Once the EOF marker is identified, the computer may be programmed to attach the non-image data file, beginning immediately after the image file EOF marker. This attaching may be performed in any manner. In one embodiment, the non-image file data is written byte by byte after the EOF until the entire non-image file is written after the EOF. By attaching the non-image data to the end of the image data file, the non-image data file does not change or affect the image file data. Once the attachment is completed, the computer has formed a single file comprising image data and non-image data.

Because the image data file is not affected by the addition of the non-image data file, a standard image file reader such as Preview®, Paint®, Microsoft® PowerPoint®, or a web browser, may read the attached file as if it were simply an image file. Once the EOF marker is reached, the image file reader stops, and ignores the non-image data file.

Further, if the computer is specifically programmed to identify and present the image file as well as the non-image data file, it may read and display both the image data file and non-image data file. In one embodiment, the computer may be programmed to read and present the image data file by reading the combined file from the beginning until it reaches the EOF marker. The computer may be further programmed to read and present the non-image data file by reading the combined file immediately after the EOF of the image data file until it reaches the end of the combined file. It should be understood that the computer may be programmed to display the multiple files without separation into separate files, or the computer may be programmed to separate the files and then present them.

Once the single file is created combining the image data file and non-image data file, it may be sent, manipulated and stored as if it were any other file.

In a further embodiment, additional non-image data files may be added, allowing the single file to contain an image data file and multiple non-image data files. In one embodiment, the multiple non-image files may be combined in a data file container such as an archive, then the data file container may be attached to the image file as described above. These image and non-image data file combinations are not limited by number, file type, or size, except by the bandwidth and storage limitations of the computing device or devices involved.

In another embodiment, a single non-image file may be placed into a file container, in the same way that multiple files may be combined into a file container. This embodiment may provide greater file stability, ensures that all required non-image file bytes are present, and may allow for password protection.

In a further embodiment, the computer may be programmed to separate the single file into its image data and non-image data. In this embodiment, the computer may be configured to read and identify the image data file by starting at the beginning of the combined file, and reading until it reaches the EOF marker of the image data file. This read data may be extracted and saved as the appropriate image data file. Next, the computer may be programmed to read the combined file starting immediately after the EOF marker until it reaches the end of the combined file. This read data may be extracted and saved as the appropriate non-image data file. The computer may further be programmed to identify the file type of the image and non-image data files, and programmed to save the files as the identified file types.

The combined file as created is distinguished from a video file in a number of ways. In particular, a video file has multiple images tracked with an audio track, and the two are associated with each other. By contrast, the combined file contemplated herein comprises a single image-data file and a distinct non-image data file. These files are combined, but not tied together. Moreover, the single image remains as an image file, even when combined, and can be displayed by image file readers. By contrast, a video file is a video file, and must be displayed by video file readers.

Further, the combined file is distinct from other image and non-image file combination methods because the original image file remains unchanged—preventing any conflict with the image data. Other combination methods utilize available space within an image file to store non-image data. For example, if non-image data is stored in an EXIF segment of a JPEG data file, any data already stored in the EXIF segment is lost. By contrast, the present combination method adds non-image data after the image file EOF marker, leaving the image file unchanged. Further, traditional archiving is distinct from the present invention because, as noted above, files are compiled into a distinct data file container, and only after de-compiling can the files contained therein be accessed by the computer programs designed to present the various file types. By leaving the image file unchanged, the combined file is less prone to corruption and loss of data, and is also reliably accessible to standard image viewing programs.

In one embodiment, a mobile computing device may be used to create a file that combines an image data file and an audio data file. The mobile computing device may be configured to capture a picture and store it as an image data file. The mobile computing device may also be configured to record and store an audio recording as an audio data file. The mobile computing device may then combine the image data file and audio data file allowing them to be transmitted together in a single file using methods described above. After combination, the mobile computing device may use a wireless network connection to transmit the combined data file. In one embodiment, a receiving computing device may use an image file viewer that will allow it to present the image data without separation of the files. In addition, the receiving computing device may be specifically programmed to present the image, and also present the audio file simultaneously by reading and presenting both the image data and audio data from the combined file. In another embodiment, the computing device may separate the image file and non-image file, save the files separately, and then present both files using a computer configured to present both, or programmed to present each using separate programs.

Turning now to FIG. 1, a flowchart of an embodiment of the present invention is shown that combines image and non-image data, and utilization the combined file is shown. Image data 22 is shown in varying embodiments accessible to the computer 100 such as image data recorded using the computer 106, image data contained in existing image files stored on the computer 104, or image data files created by other users or systems that is received by the computer 102. Image data 22 may include photographs, computer-generated or hand-created illustrations, computer generated imagery, technical or medical imagery, individual frames from a video data file, screen captures, webcam images etc. The image data 22 may be in any digital format.

In one embodiment of the present invention, the non-image data 24 to be combined with image data comprises audio files as shown in FIG. 1. The audio files are shown in varying embodiments such as audio data recorded using the computer 108, audio data contained in existing audio files stored on computer 110, or audio data files created by other systems and received by the computer 112. For example audio data files from other systems could include music or other audio files purchased from a website and transmitted to and stored on computer 100. In another embodiment of the present invention application data 26 comprises other, non-image files 114. Other non-image data 26 may include word processing documents, email messages, text messages, social postings, chat transcripts, location data, spreadsheets, account information, etc. The non-image data 24 and 26 may be in any digital format.

In the example shown in FIG. 1, the computer 100 used to gather the image data and application data is shown as a mobile device containing a digital camera and a digital audio recorder. Examples of a digital audio recorder may include devices such as a microphone, processor, memory, file storage, data transmission and receiving, visual display screen and keyboard.

Once image file 22, audio file 24 and/or other non-image data 26 inputs are obtained, input files are converted to a single data file 34 and the file is stored on the computer 100. In embodiments having more than one item of non-image data, as shown in FIG. 1, the audio data 24 and non-image data 26 are initially combined into a data file container 32. Next the computer 100 reads the image data file 22 until it reaches an end of file marker. The data file container 32 is then attached immediately after the image data file's 22 end of file marker, thereby creating a combined file 34. The data file can be viewed on the mobile computer device 100, or transmitted 40 to other remote viewing devices using a transmission medium, to specialized storage devices in the cloud, social network sharing platforms, websites designed for receiving and sharing image data or other storage systems. It should be understood that the method may be performed with just a single non-image data file, or that a plurality of files may be added to the data file container 32 and then appended to the image data file 22 creating the combined file 34.

Figure 2:
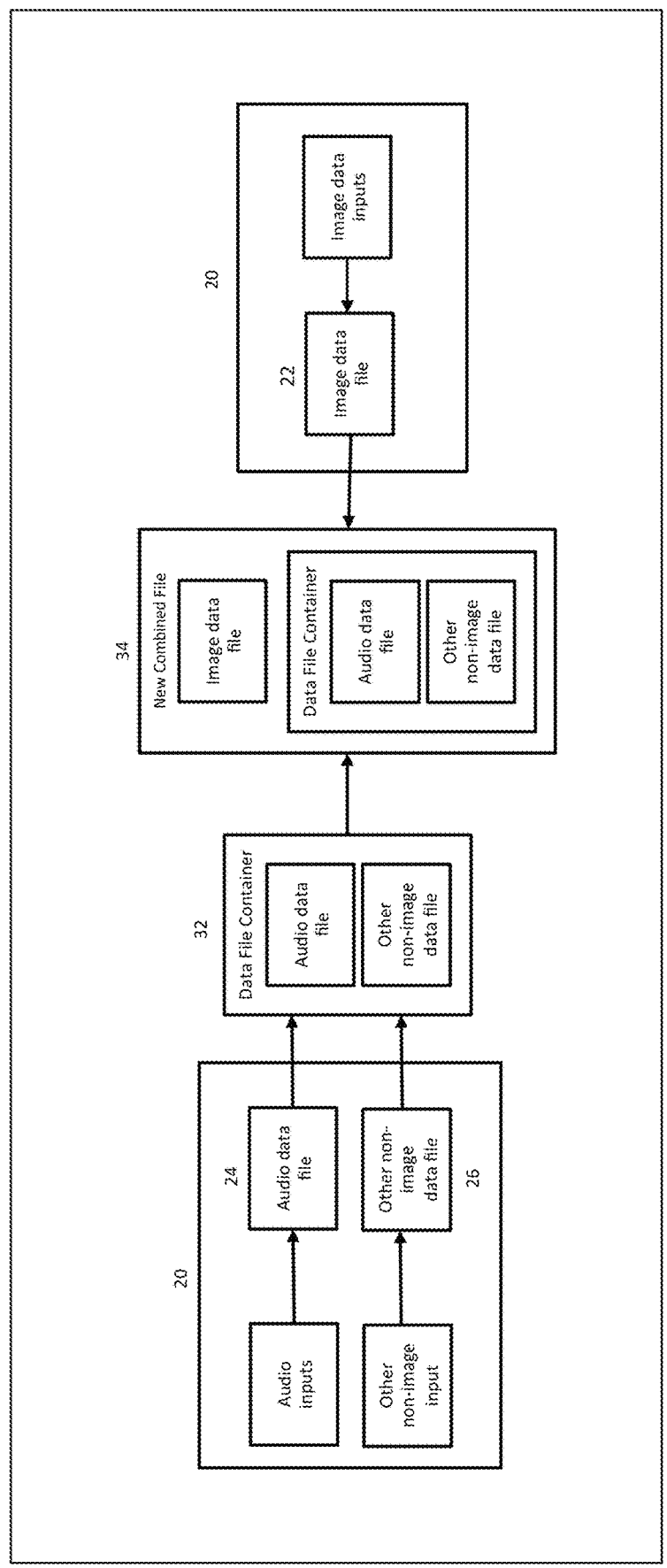
FIG. 2 provides a flow chart of an embodiment of creating the combined image and non-image file.

FIG. 2 provides a flow chart of an embodiment of creating the combined image and non-image file. Non-image data 20 comprised of audio data file 24 and other non-image data file 26 are combined into a data file container 32 using, for example, standard archiving technology in one embodiment. The computer is programmed to create a digital container into which the non-image data files 24, 26 are stored. In one use of the present invention, the files inside the file container are compressed to conserve data storage, however, compression is not essential. In one use of the present invention the file container is not password protected or otherwise encrypted, though in other uses of the present invention these security measures may be necessary.

After the data is placed in the data file container 32 it is combined with the image data file 22 to create a single file containing all of the data 34, as discussed above.

Figure 3:
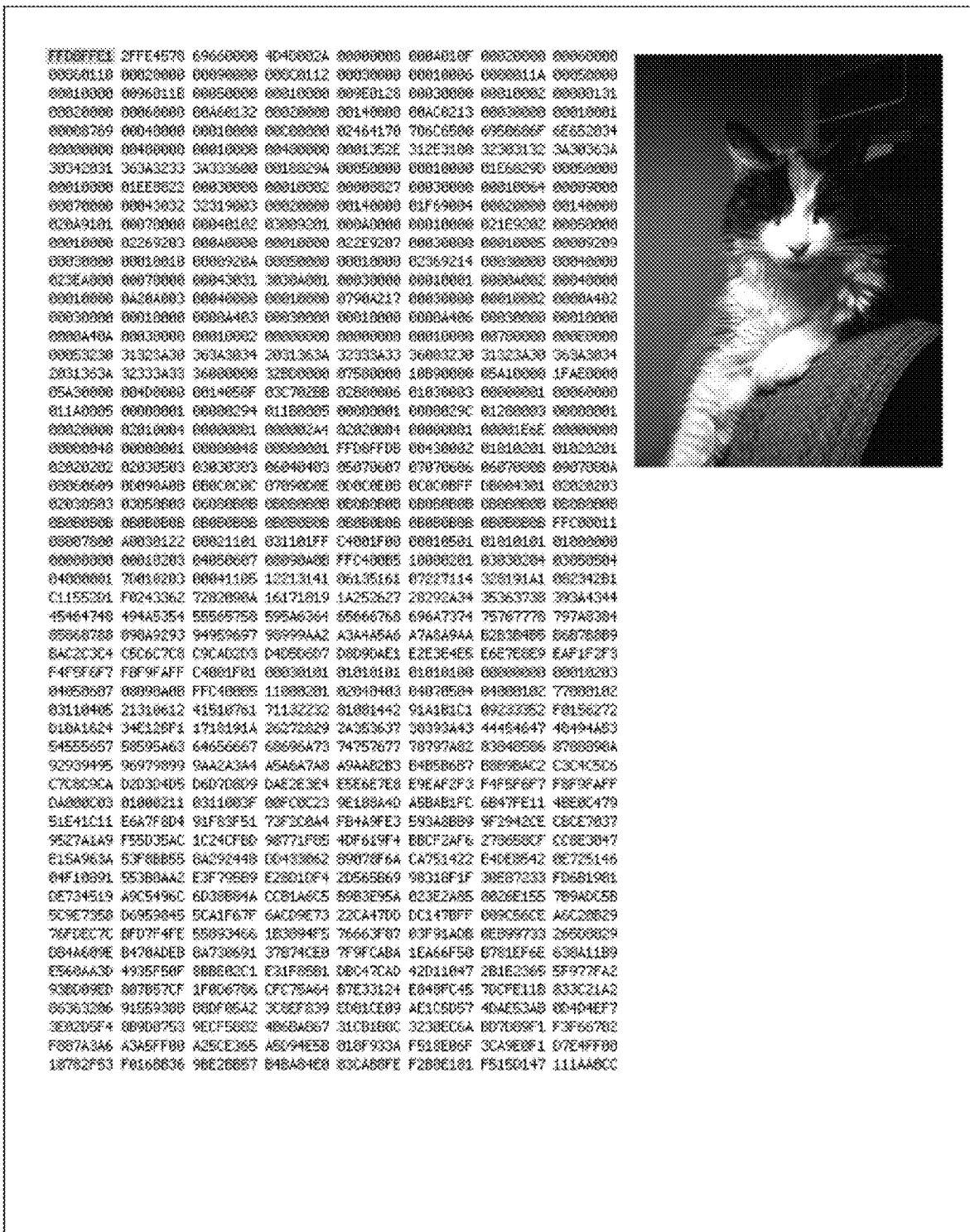
FIG. 3 provides a typical JPEG image and the file hexadecimal representation.

FIG. 3 shows a typical JPEG image and the file hexadecimal representation. The end of a JPEG file is always represented by the hexadecimal 0.times.FF followed by hexadecimal 0.times.D9. This is the JPEG EOF marker.

FIG. 4 shows a data file container comprising an audio data file and a non-JPEG data file in hexadecimal format. This data is representative of a data file container 32 of FIGS. 1 and 2.

Figure 5:
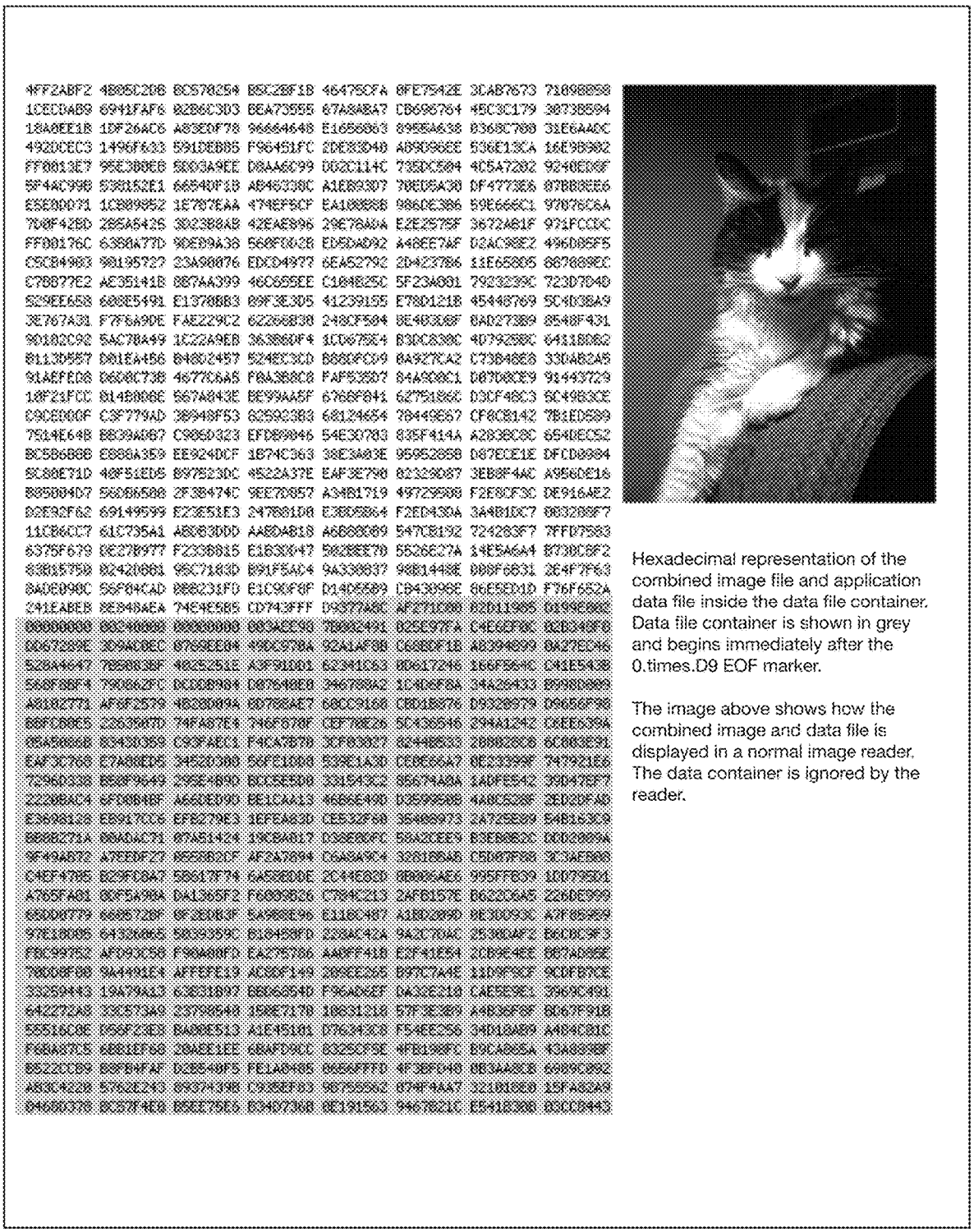
FIG. 5 provides a view of combined data file and the JPEG image that relates to it.

FIG. 5 provides a view of combined data file and the JPEG image that relates to it. The two files are joined by the computer 100 with the first byte of the data file container written immediately following the JPEG file EOF marker 0xD9. The non-JPEG data file is shown in grey highlight. The cat image shown is how the combined file is displayed in a normal JPEG reader. Non-image file data is ignored, even though it is stored within the single combined file. The combined file is then saved in the computer 100 file system. Once the data has been combined into a single file the file is ready for transmission to other users or remote viewing devices.

Figure 6:
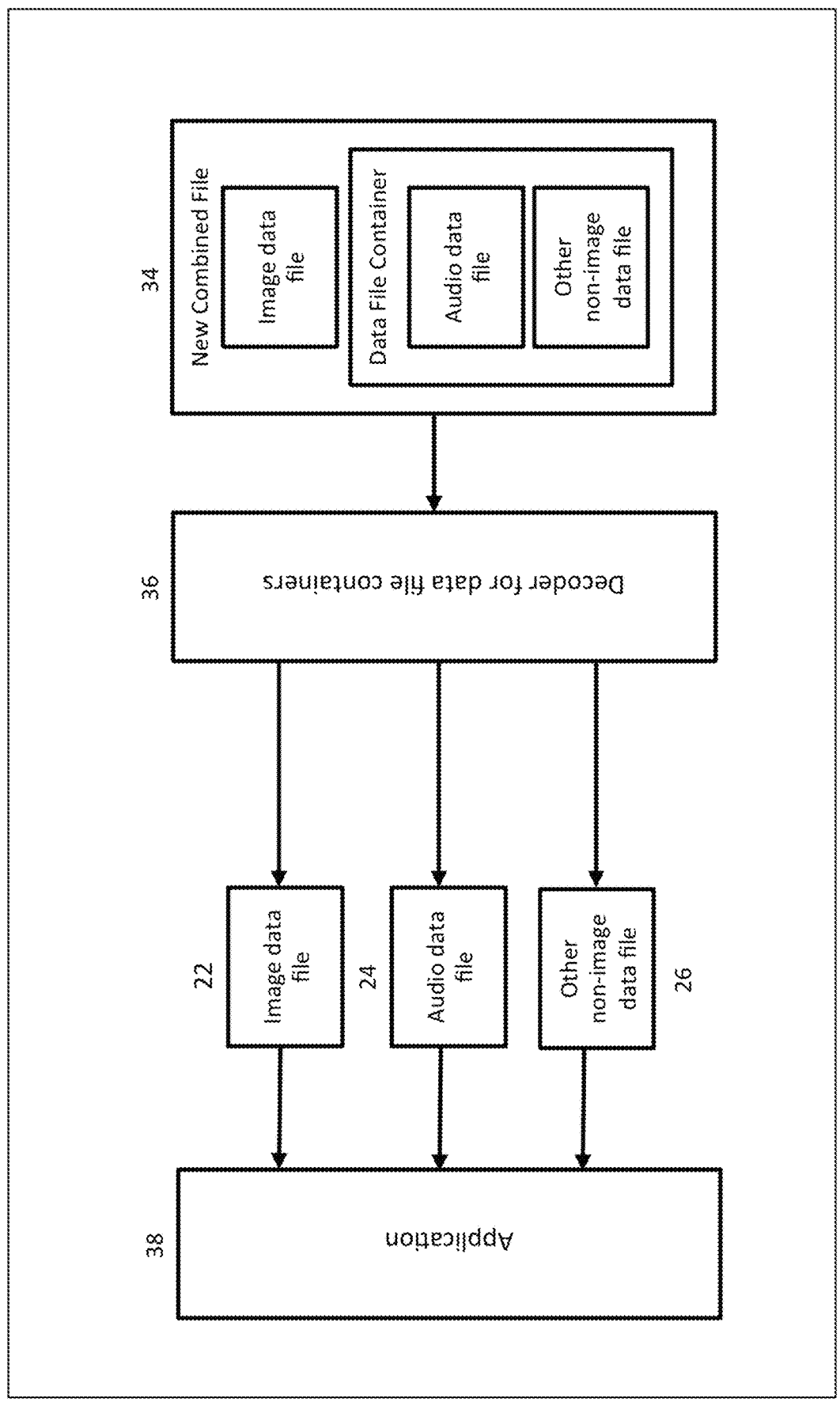
FIG. 6 provides a flow chart of separation of the combined file into its component data files.

FIG. 6 provides a flow chart of separation of the combined file into its component data files. The combined file 34 is decoded 36 by the computer to provide the image file 22, the audio data file 24 and the other non-image data file 26. These files are available for use by an application 38. In one embodiment, the combination file 34 is decoded by the computer reading from the beginning of the file until it reaches the image file EOF marker. At that point it knows that the data read before it is an image file, and saves that image file separately. The computer is then programmed to extract the remainder of the combined file 34 as a data file container 32. Further the computer then extracts the contents of the data file container 32 into its various components. In the embodiment shown, the data file container 32 is extracted into an audio data file, and another non-image data file. These three files 22, 24, and 26 may then be read and presented by application 38.

The following are just some of the practical applications for embodiments combining audio or other non-image data with image data. With the audio file, still pictures may be displayed along with a person's voice, the sound of the moment or a piece of music on a mobile computing device or desktop computer. With still pictures and audio files combined into a single image file, all of the data is transported together and is playable on demand.

In another embodiment, individuals can use the audio file to tell a story about the photo, sing a song, capture the sounds of a sporting event, share a secret, include a favorite piece of music, and preserve the moment forever.

Because all of the data is transported together, the combined file can be efficiently and reliably shared through email and SMS messages, posted to social networking and photo sharing websites, attached to online chats, or stored for safekeeping in cloud-based storage facilities.

In still another embodiment, advertisers can use the combined data files to deliver promotional or informational messages with a still image and audio. Politicians may share their speeches, messages or solicitations, and celebrities can communicate with their followers with the experience of sound and photography.

In embodiments combining text file non-image files with image files, the text files can provide tagging information, promotional coupons, private messages, or subtitles for users with hearing disabilities.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A method of presenting a combined image and non-image data file useful in reliable data transmission across a computer network comprising the steps of:
   receiving a combined image and non-image data file by at least one computer, the combined image and non-image data file having a quantity of image data as an image file, and having a quantity of non-image data, the non-image data comprising a data file container containing at least a non-image data file, and a second data file, and the data file container being written to the combined image and non-image file immediately after an end-of-file marker of the quantity of image data, the image file being unchanged from an original state, thereby reducing a likelihood of data loss and corruption, and increasing a reliability of a successful data transmission of the combined image and non-image file across the computer network;
   wherein the data file container is distinct from the image data, the data file container comprising the non-image data file and the second data file;
   wherein the data file container further contains information instructing the computer to later separate the data file container into the non-image data file and second data file, the information separate and distinct from the non-image data file and second data file;
   the at least one computer having a program stored in memory instructing the at least one computer to carry out the step of presenting only the image file using a display of the at least one computer without separating the image file from the combined image and non-image data file;
   the at least one computer having a program stored in memory instructing the at least one computer to carry out the steps of:
   reading, by the at least one computer, the combined image and non-image data file by the at least one computer to identify the image file portion, the reading being performed byte by byte starting at a beginning of the combined image and non-image file and ending at the end-of-file marker of the quantity of image data; the quantity read from beginning to the end-of-file marker being the image file;
   reading, by the at least one computer, the combined image and non-image data file by the at least one computer to identify the non-image file portion, the reading being performed byte by byte starting immediately after the end-of-file marker of the image file, and ending at an end of the combined image and non-image data file;
   extracting, by the at least one computer, the non-image file from the data file container based only on the information contained in the data file container;
   presenting the image file using the display of the at least one computer;
   presenting at least one of the non-image data file and the second data file using the at least one computer at the same time as the presenting of the image file;
   wherein the image file is a digital photograph taken from a digital camera; and
   wherein the non-image file is an audio file, and wherein the step of presenting the non-image file using the at least one computer comprises playing the audio file through a speaker in communication with the at least one computer.

2. The method of presenting a combined image and non-image data file of claim 1 wherein the non-image file is a text file.

3. The method of presenting a combined image and non-image data file of claim 1 wherein the at least one computer is a smart phone.

4. A method of separating a combined image and non-image data file useful in reliable data transmission across a computer network comprising the steps of:
   receiving a combined image file and non-image data file by a computer, the image and non-image data file having a quantity of image data as an image file, and having a quantity of non-image data, the non-image data comprising a data file container containing at least a first non-image data file, and a second data file, and the data file container being written to the image and non-image data file immediately after an end-of-file marker of the image data, the image file being unchanged from an original state, thereby reducing a likelihood of data loss and corruption, and increasing a reliability of a successful data transmission of the combined image and non-image file across the computer network;
   wherein the data file container further contains, separate from the image file, information instructing the computer to later separate the data file container into the first non-image data file and second data file, the information separate and distinct from the first non-image data file and second data file;
   the at least one computer having a program stored in memory instructing the at least one computer to carry out the step of presenting only the image file using a display of the at least one computer without separating the image file from the combined image and non-image data file;

the at least one computer having a program stored in memory instructing the at least one computer to carry out the steps of:

reading, by the at least one computer, the combined image and non-image data file by the computer to identify the image file data portion, the reading being performed starting at a beginning of the image and non-image data file and ending at the end-of-file marker of the image data, the quantity read from beginning to the end-of-file marker being identified by the computer as the image file;

saving the read and identified image file data as an image file using the computer on a file system of the computer;

reading the combined image and non-image data file by the computer to identify the non-image data file portion, the reading being performed starting immediately after the end-of-file marker of the image file, and ending at an end of the combined image and non-image data file;

extracting the first non-image file from the data file container based on the information contained in the data file container;

saving the read and identified first non-image file using the computer on a file system of the computer;

presenting the image file and at least one of the first non-image data file and second data file simultaneously using the computer after the steps of saving the read and identified image file data as the image file and saving the read and identified first non-image file;

wherein the image file is a digital photograph taken from a digital camera; and wherein the first non-image file is an audio file, and wherein the step of saving the read and identified non-image file data comprises saving the non-image file data as an audio file using the computer on the file system of the computer.

5. The method of separating a combined image and non-image data file of claim 4 wherein the data file container comprises the first non-image file and a second non-image file, and comprising the steps of:

separating the data file container into the first non-image file and the second non-image file using the computer; and saving the second non-image file using the computer on the file system of the computer.

6. The method of separating a combined image and non-image data file of claim 4 wherein the non-image file is a text file.

7. The method of separating a combined image and non-image data file of claim 4 wherein the computer is a smart phone.

8. A method of combining an image file with a non-image file useful in reliable data transmission across a computer network comprising the steps of:

taking a photograph using a digital camera in communication with the at least one computer, and storing the photograph as an image file;

recording audio with an audio recording device in communication with the at least one computer, and storing the recorded audio as an audio data file on the at least one computer;

identifying the image file accessible to at least one computer;

identifying the audio data file as a non-image file accessible to the at least one computer;

reading the image file using the at least one computer, using the at least one computer to identify an end-of-file marker of the image file;

attaching the non-image file to the image file using the at least one computer, wherein the image file remains unchanged during the attaching step, the attaching comprising the steps of:

forming a single data file container containing the non-image file data file container being the non-image file to be attached with the image file;

writing the single data file container containing to the non-image file immediately after the end-of-file marker of the image file without changing the image file data, wherein the data file container, which is separate and distinct from the image file, is written to contain information instructing the computer to later separate the non-image file from the data file container, the writing of the single data file container to the image file immediately after the end-of-file marker creating a combined image and non-image data file having the image file being unchanged from an original state, the forming of the single data file container thereby reducing a likelihood of data loss and corruption, and increasing a reliability of a successful data transmission of the combined image and non-image file across the computer network;

saving the combined image and non-image data file to a file system of the at least one computer;

reading the combined image and non-image data file using the at least one computer configured to present both the image and non-image files, the reading of the non-image data file being based on the information stored in the data file container; and presenting the image file and the non-image file simultaneously using the at least one computer.

9. The method of combining an image file with a non-image file of claim 8 further comprising the step of reading the combined image and non-image data file using a second computer configured to display image files only, the second computer program presenting only the image file, and the computer ignoring the non-image file portion of the combined image and non-image data file.

10. The method of combining an image file with a non-image file of claim 8 wherein the step of attaching the non-image file to the image file using the at least one computer comprises writing the non-image file byte by byte immediately after the end-of-file marker until the non-image file is written in its entirety.

11. The method of combining an image file with a non-image file of claim 8 wherein the non-image file is a text file.

12. The method of combining an image file with a non-image file of claim 8 wherein the at least one computer is a smart phone.

* * * * *